(12) United States Patent
Ross

(10) Patent No.: US 6,206,161 B1
(45) Date of Patent: Mar. 27, 2001

(54) SELECTIVELY ENGAGEABLE TORQUE TRANSMITTING MECHANISM WITH A ONE-WAY SCREW APPLY

(75) Inventor: Christopher Brian Ross, Chelsea, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/425,162

(22) Filed: Oct. 22, 1999

(51) Int. Cl.$^7$ .............................. F16D 21/00; F16D 25/10; F16D 25/0638
(52) U.S. Cl. .................... 192/48.91; 192/52.5; 192/54.3; 192/54.51; 192/85 AA; 192/87.15; 192/41 R
(58) Field of Search ................................. 192/54.51, 54.3, 192/87.11, 87.15, 85 AA, 52.5, 41 R, 48.91, 94

(56) References Cited

U.S. PATENT DOCUMENTS

| | | | |
|---|---|---|---|
| 1,841,284 | * | 1/1932 | Gillett .............................. 192/52.5 X |
| 2,799,375 | * | 7/1957 | Forster ............................. 192/54.3 X |
| 3,273,681 | * | 9/1966 | Seifert ............................. 192/54.51 |
| 3,730,314 | * | 5/1973 | Herr et al. ....................... 192/54.3 X |
| 4,253,557 | * | 3/1981 | Bunger ............................. 192/54.51 |
| 5,106,348 | * | 4/1992 | Koivunen ........................ 192/54.3 X |
| 5,281,190 | * | 1/1994 | Koivunen .................... 192/85 AA X |
| 5,462,147 | * | 10/1995 | Sherman ....................... 192/48.91 X |
| 6,039,160 | * | 3/2000 | Joppeck ............................. 192/52.5 |

OTHER PUBLICATIONS

"The Weller Clutch" as described in Gott, Philip G., "Changing Gears; The Development of the Automotive Transmission" SAE Historical Series, 1991 originally published in Roos, Delmar G., James, William S., "Free Wheeling" SAE Transactions, vol. 26, 1931, p. 393.
Hurst, John W., "Chrysler's New 300 Sterndrive", SAE 770713.
Koivunen, Erkki et al. "The Multi–Mode Clutch—A New Technology for Free–Wheeler Shifting Automatic Transmissions" SAE 930911.

* cited by examiner

*Primary Examiner*—Rodney H. Bonck
(74) *Attorney, Agent, or Firm*—Laura C. Hargitt

(57) ABSTRACT

A fluid operated selectively engageable torque transmitter has a fluid operated piston that is pressurized to initiate engagement of a plurality of friction plates. The plates are alternately splined to an input member and an output member. One of the input or output members has a hub member threadably engaged therewith. The hub member has one set of plates and an apply plate splined thereto. Also connected with the threaded hub is a reaction plate. When the piston is lightly pressurized, the hub will traverse the input or output member on which it is threaded until the apply plate abuts a reaction surface on the member at which point the torque transmitter will be fully engaged. Upon a torque reversal, the threaded hub will traverse in the opposite direction to disengage the torque transmitter, thereby providing a direction sensitive mechanism. When the piston is fully pressurized, the torque transmitter will respond in a normal manner to transmit torque in both directions.

6 Claims, 4 Drawing Sheets to a drive wheel of a vehicle, not shown. The housing 44 has a spline portion 48 on which the friction plates or discs 38 and the apply plate 40 slidably engage. The apply plate 40 and the piston 14 are rotatably connected through a thrust bearing 50 which permits relative rotation between the piston 14 and the apply plate 40.

SELECTIVELY ENGAGEABLE TORQUE TRANSMITTING MECHANISM WITH A ONE-WAY SCREW APPLY

TECHNICAL FIELD

This invention relates to torque transmitting mechanisms for automatically shifting power transmissions and more particularly to such transmissions having a one-way torque transmitting mechanism.

BACKGROUND OF THE INVENTION

Many of the currently available passenger vehicles have automatically shifting transmissions to provide a plurality of discrete gear ratios between the engine and the drive wheels. Most of these transmissions employ at least one directional sensitive torque transmitting mechanism or one-way drive mechanism to accommodate a smooth ratio interchange. Generally this interchange occurs between the first forward ratio and the second forward ratio. The more premium of the automatic shifting transmissions utilize more than one direction sensitive torque transmitting mechanism.

These transmission mechanisms also have a positive torque transmitter in parallel with the direction sensitive mechanism to accommodate engine coast braking. For example, when negotiating a steep grade, it is desirable to manually engage one of the lower drive ratios such as low gear or second gear. If this ratio is established, during normal driving, by a one-way device, it becomes necessary to also include a selectively engageable friction torque transmitter, such as a clutch or brake, to enforce engine coast braking which will augment or perhaps supersede any necessary vehicle service brake application.

The direction sensitive torque transmitters most often found in the automotive vehicle transmission are of the roller or sprag variety. These one-way mechanisms of course add cost to the transmission. The friction torque transmitter used in parallel with these one-way devices is generally a multi-plate fluid operated mechanism. In many design configurations, the one-way device is located radially inward of a portion of the friction mechanism resulting in the friction mechanism having a larger outer diameter than necessitated by the design requirements.

In an effort to overcome some of the deficiencies of the combination of a one-way torque transmitting mechanism and a parallel friction torque transmitting mechanism, it has been proposed to employ a valve mechanism within the friction torque transmitter that is direction sensitive. One such device is described in a Society of Automotive Engineering (SAE) publication 930911 and U.S. Pat. Nos. 5,031,746 and 5,106,348 issued to Erkki Koivunen. While these devices are effective in eliminating the roller or sprag, they require additional valving and cam surfaces to be incorporated into the friction torque transmitting mechanism.

SUMMARY OF THE INVENTION

It is an object of the present invention to provide an improved torque transmitting mechanism providing both direction sensitive torque transmission and selectively controlled bi-directional torque transmission.

In one aspect of the present invention, a multi-plate friction mechanism has a threaded hub drivingly connected with one set of friction plates and threadably engaged with a threaded portion of a transmission slidably housing a fluid operated piston. In another aspect of the present invention, a stop member is secured with the threaded portion to limit the travel of the threaded hub in one direction along the threaded portion.

In yet another aspect of the present invention, a bearing supporting relative rotation is positioned between the piston housing and an apply plate that is drivingly connected with the threaded hub. In still another aspect of the present invention, the threaded hub is secured with a stationary portion of the transmission and the bearing is secured with the piston.

In a further aspect of the present invention, a single fluid operated friction torque transmitting mechanism is controlled to operate as a coast braking torque transmitter, a direction sensitive torque transmitter and a conventional fluid operated torque transmitter. In a yet further aspect of the present invention, the torque transmitter can be either a stationary reaction member, such as a brake, or a rotating member, such as a clutch.

DESCRIPTION OF THE EXEMPLARY EMBODIMENTS

Figure 1:
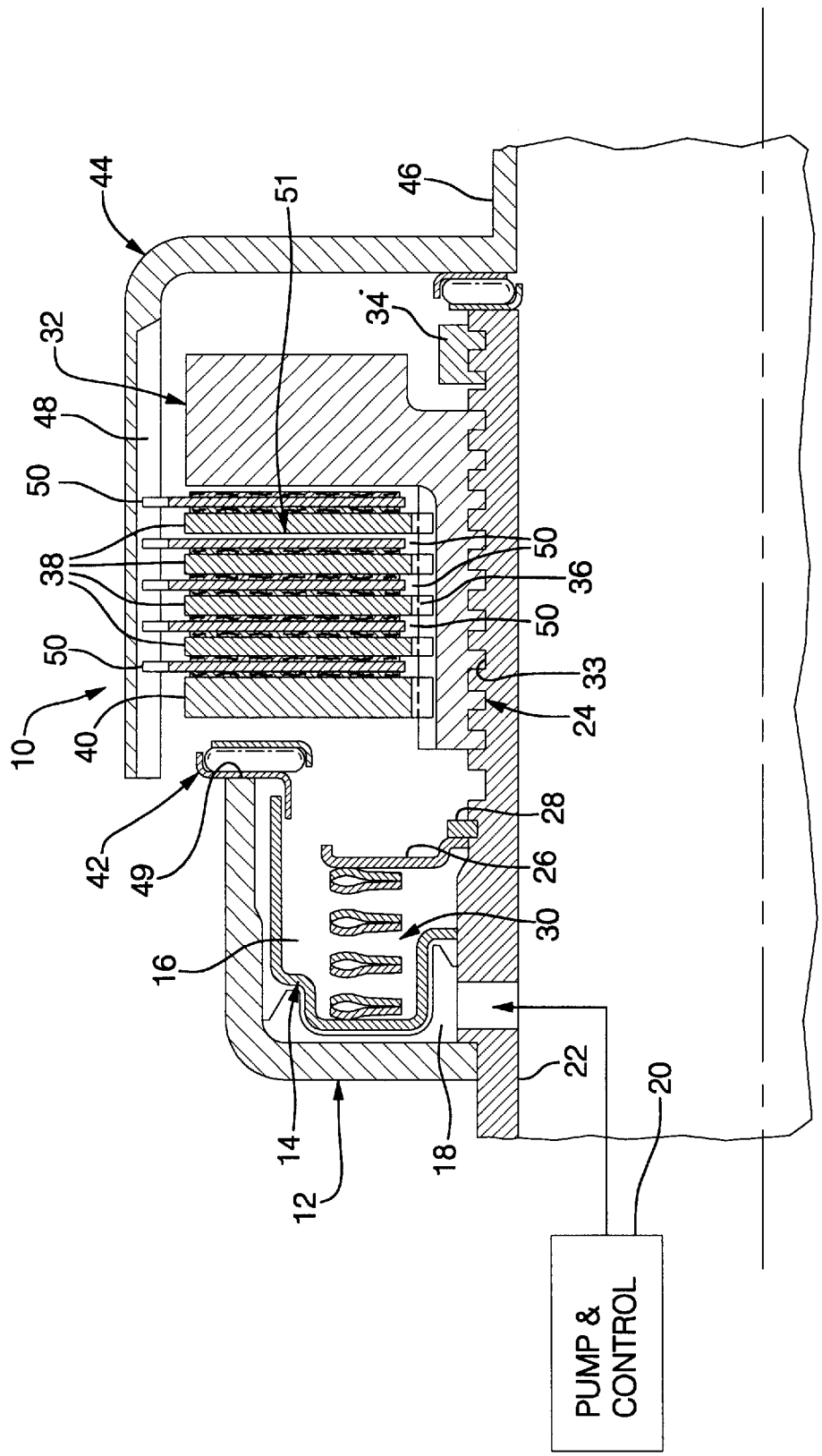
FIG. 1 is a diagrammatic representation of a rotating torque transmitter incorporating one embodiment of the present invention.

A rotating torque transmitter or clutch 10 includes an input housing 12 having a fluid operated piston 14 slidably disposed in an annular cavity 16. The piston 14 and the cavity 16 form an apply chamber 18 which communicates with a conventional pump and electro-hydraulic control 20. The pump and control 20 will supply pressurized fluid to the chamber 18 when the clutch 10 is to be engaged. The housing 12 is secured with an input shaft 22 that supplies power to the clutch 10. The shaft 22 extends through the center of the housing 12 and has formed thereon a threaded portion 24. A retainer plate 26 is positioned on the shaft 22 by a locking ring 28 to provide a reaction member for a return spring 30 that is trapped between the piston 14 and the retainer plate 26.

A reaction plate 32 has a threaded portion 33 that threadably engages the threaded portion 24. The reaction plate 32 is limited in rightward travel on the threaded portion 24 by a stop member 34. The reaction plate 32 has a spline portion 36 radially outward of the threaded portion 33. The spline portion 36 slidably supports a plurality of friction discs or plates 38 and an apply plate 40. The reaction plate 32, friction plates 36 and apply plate 40 will traverse along the input shaft 22 when relative rotation therebetween is present. Rightward traversing of the reaction plate 32 is limited by the stop member 34 and leftward traversing of the reaction plate 32 is limited by an annular needle or roller bearing 42 and the housing 12. The threaded portions 24 and 33 have a high helix angle on the threads such that a relatively high traverse distance is achieved for a small rotary distance. For example, it is contemplated that the clutch can traverse from the stop member 34 to the housing 12 with two degrees or less of rotary movement.

The reaction plate 32 and the friction plates 38 are surrounded by an annular output housing 44. The output housing 44 is secured to an output shaft 46. The shaft 46 is drivingly connected with a gear member, not shown. The housing 44 has a spline portion 48 in which is drivingly connected a plurality of friction plates or discs 50. The plates 50 are alternated with the apply plate 40, the friction plates 38 and the reaction plate 32. The friction plates 50 have a friction surface bonded thereto in a well-known manner and the friction plates 38 are steel members. The structure and manufacture of these plates is well-known. When the apply plate 40, friction plates 38 and reaction plate 32 are forced into frictional engagement with the friction plates 50 by the piston 14, torque will be transmitted between the input housing 12 and output housing 44.

The friction plates 38 and 50, the apply plate 40 and the reaction plate 32 cooperate to from a clutch pack 51 that will rotate with the output housing 44 thereby creating a rotational differential between the threaded portions 24 and 33 on the shaft 22 and reaction plate 32 respectively. Due to the rotational differential and the direction of torque transmission, the reaction plate 32 will traverse axially along the shaft 22 until either the stop member 34 or the bearing 42 and housing 12 is reached. If the torque sense (direction) is such that the reaction surface 49 on the housing 12 is abutted, the torque capacity of the clutch 10 will be equal to the torque transmitted regardless of the pressure at the apply piston 14. If the opposite torque sense is present, the stop 34 is abutted and the torque capacity is proportional to the pressure applied to the apply piston 14 as occurs in a conventional torque transmitting mechanism.

When a direction sensitive clutch is needed in the transmission, a small amount of pressure is directed to the apply chamber 18 from the pump and control 20. The piston 14 will advance to abut the apply plate 40 through the bearing 42. The friction plates 38 and 50 will transfer torque from the shaft 22 to the shaft 46. The torque being transmitted will cause the threaded portions 24 and 33 to rotate relative to each other such that the reaction plate 32, the friction plates 38 and 50 and the apply plate 40 will translate leftward to force the piston into the cavity 30 until the apply plate 40 is stopped by a reaction surface 49 on the housing 12 and the bearing 42. Due to the high lead angle of the threads, this linear movement will occur in approximately two degrees of rotation.

The amount of force compressing the plates 38 and 50 will depend on the amount of torque being transferred due to the mechanical advantage of the threads on the threaded portions 24 and 33. When the piston is fully retracted into the housing 12, the pressure in the apply chamber 18 is exhausted. When the direction of torque transfer is reversed, that is the output shaft attempts to drive the input shaft, the threaded portions 33 and 24 will cause the plate members to translate rightward until the friction plates 38 and 50 lose the capacity to transmit torque. At this point the clutch 10 is disengaged.

To fully engage the clutch 10, the piston 14 is pressurized to engage the apply plate 40 through the bearing 42. This will cause the threaded portions to translate as described above. The direction of translation will depend on the direction of torque transmission. If the torque is in a positive direction, the threaded portion 33 will translate leftward until the apply plate is stopped by the housing 12. If the torque is in a negative direction, such as during coast braking, the threaded portion 33 will translate rightward until the reaction plate 32 abuts the stop 34. Since the piston is pressurized, it will also be moved rightward to maintain the friction plates 38 and 50 in engagement. Thus the clutch 10 will be fully engaged to transmit torque in both directions. The torque capacity of the clutch 10 is dependent on the amount of engagement pressure in the apply chamber 18 when the stop 34 is abutted. When the housing 12 provides the stop for the clutch pack 51, the torque capacity of the clutch 10 is self regulating. When the apply chamber 18 is exhausted, the clutch 10 will disengage upon a torque reversal.

Figure 2:
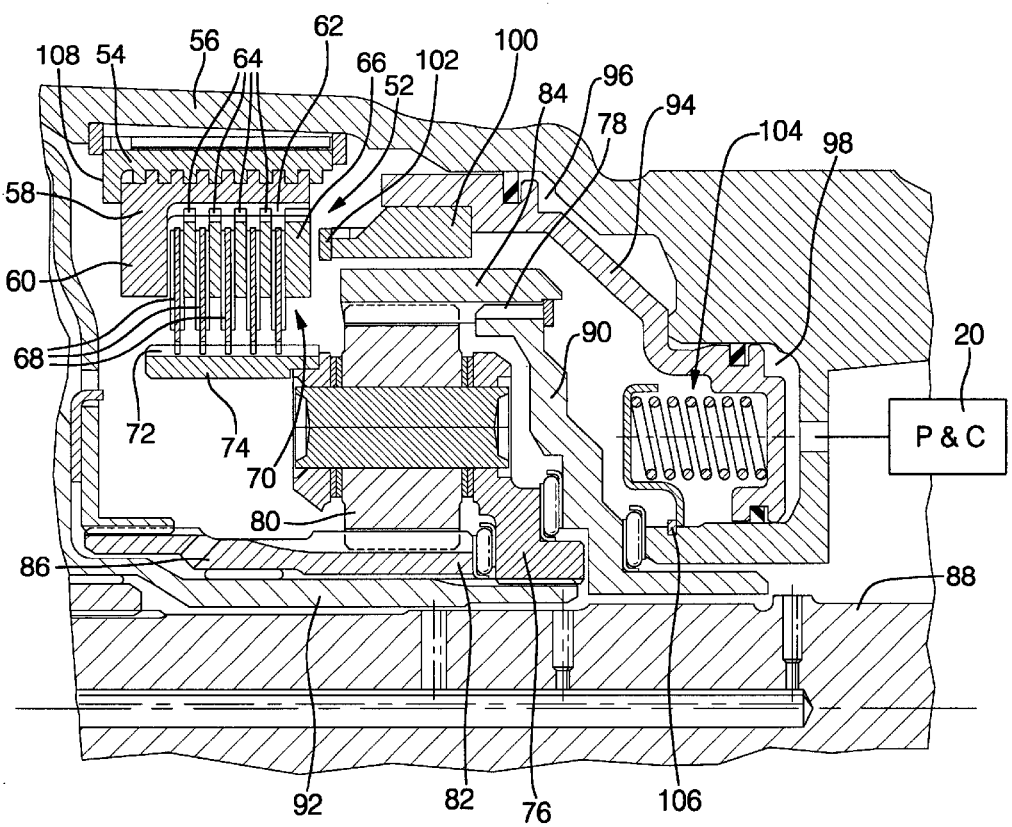
FIG. 2 is a diagrammatic representation of a stationary torque transmitter incorporating another embodiment of the present invention.

A stationary torque transmitter or brake 52, FIG. 2, includes an annular threaded portion 54, which is secured to a transmission housing 56, threadably engaging an annular threaded portion 58. The threaded portion 58 has formed integral therewith a reaction plate 60. A spline 62 is formed internally of the threaded portion 58 to slidably support a plurality of friction discs or plates 64 and an apply plate 66. A plurality of friction plates or discs 68 are interdigitally positioned with the friction plates 64 to form a brake pack 70 in cooperation with the reaction plate 60 and the apply plate 66. The plates 68 are slidably disposed on a spline 72 formed on a hub 74 that is secured to a carrier assembly 76 in a planetary gear arrangement 78.

The planetary gear set 78 also has a plurality of pinion gears 80, mounted on the carrier assembly 76, in meshing relation with a sun gear 82 and a ring gear 84. The sun gear 82 has a sleeve shaft 86 that connects with other members of a transmission, not shown. The ring gear 84 is drivingly connected with a transmission output shaft 88 through a hub 90. The carrier assembly 76 is also connected with other transmission components, not shown through a sleeve shaft 92.

The brake 52 further includes a piston 94 that is slidably disposed in the housing 56 and cooperates therewith to form two apply chambers 96 and 98 both of which communicate with the pump and control 20. The piston 94 has an extension 100 on which a thrust washer 102 is secured for alignment with the apply plate 66. A return spring assembly 104 is installed between the piston 94 and a locating ring 106 secured to the housing 56. This assembly 104 urges the piston 94 axially away from the brake pack 70. When the piston 94 is not pressurized, the piston 94 is out of contact with the apply plate 66 so that the brake pack 70 can free wheel in both directions. This is the disengaged condition of the brake 52.

The brake 52 functions similarly to the clutch 10. The brake 52 is used to provide reaction during both a forward operation and a reverse operation of the transmission. The brake 52 has a direction sensitive operation during the forward operation as well as a coast braking function during some forward operations. During the reverse operation it is necessary for the brake 52 to hold the carrier assembly 76 as a reaction member in both directions of torque transmission. In a prior art transmission assembly it is necessary to install a one-way mechanical torque transmitter in parallel with a friction brake to perform these tasks. With the present invention only the brake 52 and the threaded portion 54 are required.

When the torque transmitter 52 is to be operated in a direction sensitive manner, the apply chamber 98 is pressurized at a low level which will just overcome the force in the return spring assembly 104 and enforce abutment between the thrust bearing 102 and the apply plate 66. This will cause the brake pack 70 to transmit torque and since the torque is in the negative direction, the reaction plate 60 will translate rightward forcing the piston into the housing 56 until the piston abuts the housing 56. Further translation of the reaction plate 60 will cause the brake 52 to be fully applied. The pressure in the apply chamber can then be released. When the torque imposed on the carrier assembly 76 is reversed, such as during a ratio interchange, the reaction plate 60 will translate leftward on the threaded portions 54 and 58 until the brake pack 70 is no longer capable of supporting torque transmission into the housing 56. In at least one currently available transmission this action represents low gear operation and a ratio interchange from low gear to second gear.

However during some low gear operation it may be necessary to engage the brake 52 during all phases of transmission operation such as during engine coast braking on a grade. To effect this operation, the piston 94 is energized at a high pressure level to fully engage the brake pack 70. If the torque on the brake pack 70 is in the negative, the reaction plate will translate rightward; and if the torque on the brake pack is in the positive direction, the reaction plate will translate leftward until a stop member 108 is abutted. The pressure is maintained on the piston 94 and the brake 52 remains engaged. The brake pack will translate from stop to stop as the torque is reversed but will remain engaged during the translation. As mentioned above with the clutch 10, angular displacement of approximately two degree by the threaded portion 54 will result in the full translation of the brake pack 70. It will be appreciated, by those skilled in the art, that the above described operation will also be useful during reverse operation. However, since the torque reaction at the brake 52 can be significantly higher than for low range, both apply chambers 96 and 98 will be pressurized to increase the torque capacity of the brake 52 when the stop 108 is abutted by the reaction plate 60. During forward torque transmission, the torque capacity of the brake 52 is self regulating when the apply plate 66 forces the piston 94 into abutment with the housing 56.

Figure 3:
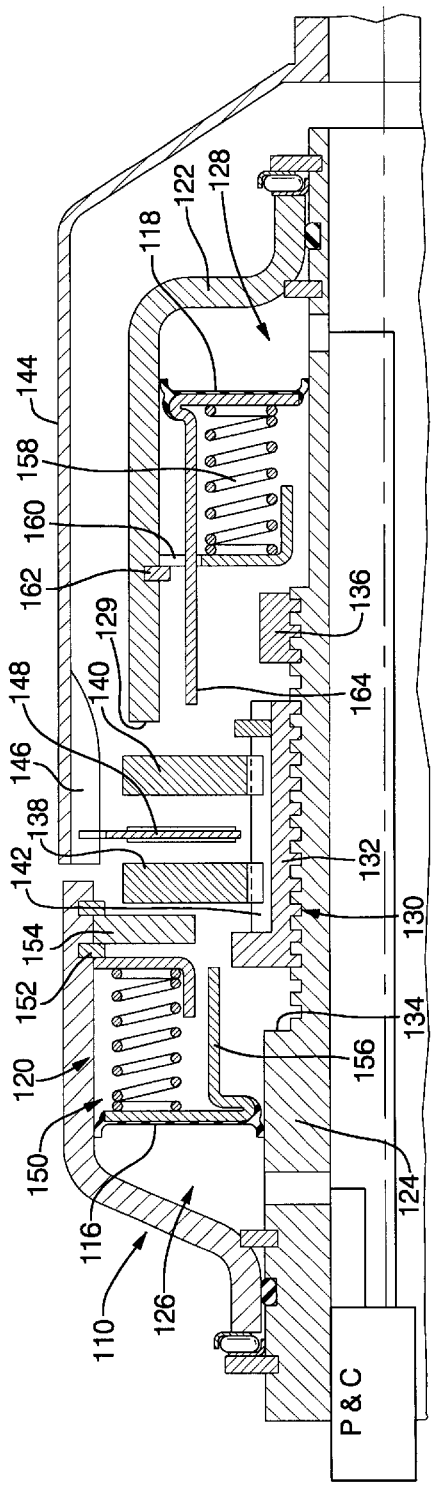
FIG. 3 is a diagrammatic representation of a rotating torque transmitter incorporating yet another embodiment of the present invention.
Figure 4:
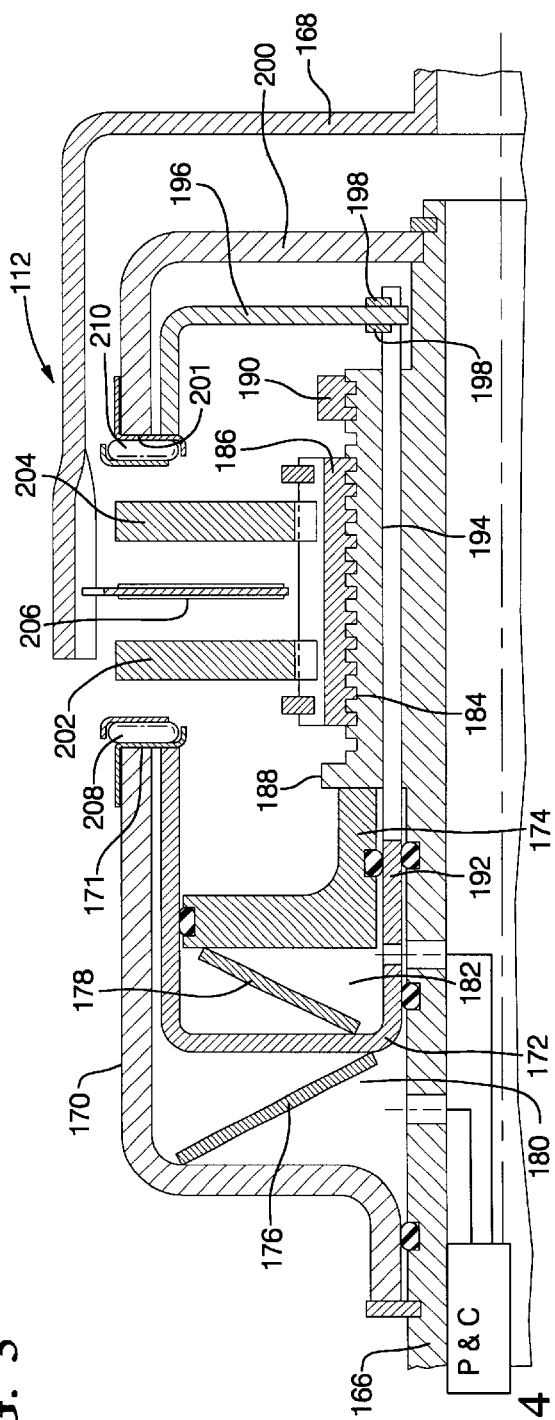
FIG. 4 is a diagrammatic representation of a rotating torque transmitter incorporating still other embodiment of the present invention.
Figure 5:
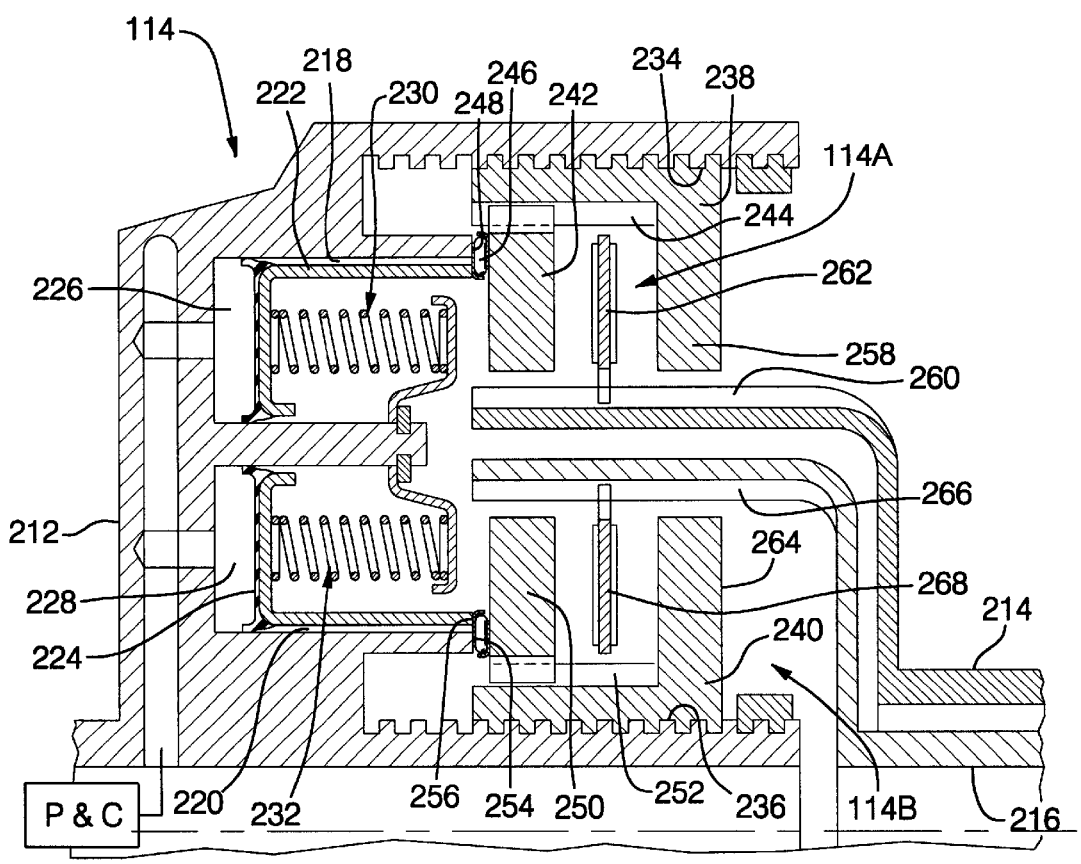
FIG. 5 is a diagrammatic representation of a rotating torque transmitting mechanism incorporating a further embodiment of the present invention.

FIGS. 3, 4, and 5 represent various torque transmitter assemblies 110, 112 and 114, respectively, that are possible with the present invention. The torque transmitter assembly 110 has longitudinally spaced pistons 116 and 118 that are slidably positioned in housings 120 and 122, respectively. The housings 120 and 122 are both drivingly connected with an input shaft 124 such that the shaft 124, the housings 120 and 122 and the pistons 116 and 118 cooperate to form respective apply chambers 126 and 128. The housing 122 has a reaction surface 129 which provides an abutment during direction sensitive torque transmission during light pressurization of the chamber 128. The shaft 124 has a threaded portion 130 on which is threadably engaged a threaded hub 132. A shoulder 134 on the shaft 124 limits linear motion of the hub 132 in the leftward direction and a stop 136 secured on the shaft 124 limits the rightward linear motion of the hub 132. A pair of spaced apply/reaction plates 138, 140 are splined on an outer splined circumference 142 of the hub 132.

An output housing 144, disposed circumjacent the housing 122, has a spline 146 formed thereon that slidably engages a friction plate 148. As with the torque transmitters 10 and 52 a plurality of friction plates can be splined to both the hub 132 and the housing 144 intermediate the apply/reaction plates 138, 140 depending on the maximum clutch capacity required. The output housing is connected with a transmission component, such as a gear, not shown. The piston 116 is urged leftward by a return spring assembly 150 that is compressed between the piston 116 and a locking ring 152. The housing 120 also has drivingly connected thereto a plate 154 that is axially aligned with the apply/reaction plate 138. A thrust bearing, not shown, can be disposed between the plates 138, 154; or one of the plates 138, 154 can have a thrust reaction surface formed thereon. The piston 116 has an annular extension 156 that is radially inward of the plate 154 such that during rightward axial movement of the piston 116, the extension 156 will engage the apply/reaction plate 138.

The piston 118 is urged rightward by a return spring assembly 158 which is compressed between the piston 118 and an annular hub 160 that is positioned on the housing 122 by a locking ring 162. The piston 118 has a plurality of extensions 164 that extend through slots in the hub 160. The extensions 164 will abut the apply/reaction plate 140 during leftward axial movement of the piston 118 when the chamber 128 is pressurized.

The torque transmitter 110 is a selectable directional torque transmitting mechanism. The torque transmitter 110 will operate essentially the same as the torque transmitter 10 to provide a coast braking connection, a dual direction torque transmitter and a direction sensitive torque transmitter. If the piston 116 is pressurized by a low level pressure, the torque transmitter will provide a direction sensitive device in a forward direction; and if the piston 118 is pressurized by a low level pressure, the torque transmitter 110 will provide a direction sensitive mechanism in the reverse direction. Full pressurization of either or both pistons 116 and 118 will provide full engagement of the torque transmitter 110. The torque transmitter 110 will operate equally well as a clutch or as a brake. If the shaft 124 is connected with a rotating power source and the housing 144 is connected with a gear, the torque transmitting mechanism 110 is a clutch. If the shaft 124 is connected with a gear and the housing 144 is a stationary element such as the transmission casing, the torque transmitting mechanism 110 is a brake.

The torque transmitting mechanism 112 is similar to the torque transmitting mechanism 110 in that it will function as a selectable direction torque transmitting mechanism. The mechanism 112 has an input shaft 166, and an output housing 168. A piston housing 170 is drivingly connected with the input shaft 166 and provided with a reaction surface 171. A piston 172 is slidably disposed in the housing 170 and a piston 174 is slidably disposed in the piston 172. Both pistons 172 and 174 are urged rightward by respective Belleville springs 176 and 178. The piston 172 and the housing 170 cooperate to form an apply chamber 180 and the pistons 172 and 174 cooperate to form an apply chamber 182. The piston 174 provides a reaction wall when the chamber 182 is pressurized. Pressurization of the chamber 180 will result in the piston 172 being urged rightward against the spring 178 and pressurization of the chamber 182 will result in the piston 172 being urged leftward against the spring 176. The piston 172 is known as a "push/pull" piston.

The shaft 166 has a threaded portion 184 on which is threadably engaged a threaded hub 186. A shoulder 188, formed on the shaft 166 limits leftward translation of the hub 186 on the shaft 166 and a stop member 190 secured with the threaded portion 184 limits rightward translation of the hub 186 on the shaft 166. The piston 172 has a plurality of extensions 192 that pass through slots 194 formed in the hub 186. An apply hub 196 is secured with the extensions 192 by locking rings 198. A reaction hub 200 is secured with the shaft 166 and has a reaction surface 201 formed thereon. A pair of reaction/apply plates 202 and 204 are slidably disposed on the hub 186 and a friction plate 206 is slidably disposed on the housing 168 in a position intermediate the reaction/apply plates 202, 204. As with the above described torque transmitters 10, 52 and 110, a plurality of alternating friction plates can be employed between the plates 202, 204. The number of friction plates utilized is determined by a number of design factors such a maximum torque capacity, heat sink capacity, mean radius and maximum apply pressure to name a few. A needle or thrust bearing 208 is placed between the housing 170 and the plate 202 and a needle or thrust bearing 210 is placed between the hub 200 and the plate 204. These bearings 208 and 210 will accommodate the slight relative rotary movement between the adjacent members during the engagement of the torque transmitter 112.

A light pressure force in the chamber 180, sufficient to overcome the spring 178 will cause the torque transmitting mechanism 112 to act as a direction sensitive mechanism in one rotational direction and a light pressure force in the chamber 182 will cause the torque transmitting mechanism to act as a direction sensitive mechanism in the opposite rotational direction. When the chamber 180 is lightly pressurized, the piston 172 will move rightward to engage the plate 202 through the bearing 208 to initiate translation of the hub 186 until the plate 202 is in abutment with the reaction surface 171. When the chamber 182 is lightly pressurized, the piston 172 will move leftward to cause the apply hub 196 to engage the plate 204 through the bearing 210. This will initiate rightward translation of the hub 186 until the reaction surface 201 is abutted and the torque transmitter 112 is fully engaged. Full pressurization of either chamber 180 or 182 will enforce full engagement of the torque transmitting mechanism 112. As with the above described torque transmitting mechanism 110, the torque transmitting mechanism 112 can be employed as either a clutch or a brake depending on the other transmission mechanisms connected therewith.

The torque transmitting mechanism 114, shown in FIG. 5, has an input housing 212 and a pair of output housings 214 and 216. The housing 212 has a pair of radially aligned annular cavities 218 and 220 in which respective annular pistons 222 and 224 are slidably disposed. The pistons 222 and 224 cooperate with the cavities 218 and 220 to form respective apply chambers 226 and 228. The piston 222 is urged leftward in the cavity 218 by a return spring assembly 230 and the piston 224 is urged leftward in the cavity 220 by a return spring assembly 232. The housing 212 has an outer threaded portion 234 and an inner threaded portion 236 on which are threadably engaged an outer threaded hub 238 and an inner threaded hub 240 respectively. An apply plate 242 is slidably disposed on a spline 244 on the hub 238 and is axially aligned with a bearing 246, the piston 218 and a reaction surface 248 that is formed on the housing 212. An apply plate 250 is slidably disposed on a spline 252 on the hub 240 and is axially aligned with a bearing 254, the piston 224 and a reaction surface 256 that is formed on the housing 212.

The threaded hub 238 has a reaction plate 258 formed therewith or secured thereto. The output hub 214 has a spline portion 260 on which is slidably disposed a friction disc or plate 262. The plate 262 is axially aligned between the apply plate 242 and the reaction plate 258 such that when the chamber 226 is pressurized, the piston 222 will move axially to initiate frictional torque transfer between the housing 212 and the hub 214. As described above, a light pressure will cause the threaded hub 238 to translate toward the housing 212 forcing the piston 222 into the housing 212 until the reaction surface 248 stops further axial movement and the torque transmitter 114A is fully engaged and the pressure in the chamber 226 is released. Upon torque reversal, the torque transmitter 114A will disengage. The transmitter 114A is comprised of the housing 212, the piston 222, the apply plate 242, the reaction plate 258 and the friction plate 262. As with the previously described torque transmitter mechanisms, the torque transmitter 114A is fully applied for two way torque transmission when sufficient fluid pressure is communicated to the chamber 226.

The threaded hub 240 has a reaction plate 264 formed therewith or secured thereto. The output hub 216 has a spline portion 266 on which is slidably disposed a friction disc or plate 268. The plate 268 is axially aligned between the apply plate 250 and the reaction plate 264 such that when the chamber 228 is pressurized, the piston 224 will move axially to initiate frictional torque transfer between the housing 212 and the hub 216. As described above, a light pressure will cause the threaded hub 240 to translate toward the housing 212 forcing the piston 224 into the housing 212 until the reaction surface 256 stops further axial movement and the torque transmitter 114B is fully engaged and the pressure in the chamber 228 is released. Upon torque reversal, the torque transmitter 114B will disengage. The transmitter 114B is comprised of the housing 212, the piston 224, the apply plate 250, the reaction plate 264 and the friction plate 268. As with the previously described torque transmitter mechanisms, the torque transmitter 114B is fully applied for two way torque transmission when sufficient fluid pressure is communicated to the chamber 228.

The torque transmitting mechanism 114, as described above, consists of the two torque transmitters 114A and 114B which can be engaged independently or in concert the output hubs 214 and 216 are connected with distinct members of the transmission. For example, the input housing 212 can be connected with a rotary input member and the output hubs 214 and 216 can be connected with gear members or with a gear member and a power output shaft. Also, the input housing 212 can be connected with a gear member and the hub 216 can be connected with another gear member while the hub 214 is connected with the transmission housing. This permits the interconnection of two gear members or the braking of one gear member with a single torque transmitting mechanism. Those skilled in the art will appreciate the many possibilities for this torque transmitted. The threaded portions 234 and 236 can have either the same directional sense (right handed or left hand) or opposite directional sense. This will determine the direction of torque transmission in a direction sensitive mechanism. Also, it will be appreciated that the output hubs 214 and 216 can be a single member thereby providing a torque transmitting mechanism similar to those described for the transmitting mechanisms 110 and 112.

What is claimed is:
1. A torque transmitting mechanism comprising:

an input member;

an output member;

a fluid operated piston slidably disposed in a housing on one of said members;

means for pressurizing said piston;

a threaded hub threadably engaging said one member for limited axial translation thereupon;

friction disc means and an apply plate axially slidably and non-rotatably disposed on said one member, and a reaction plate connected for common rotation with said one member;

friction plate means slidably and non-rotatably disposed on another of said input and output members and being alternately spaced with said friction disc means;

a reaction surface on said one member axially aligned with said apply plate to provide a reaction surface for said torque transmitting mechanism when torque is being transmitted in a first rotary direction and said threaded hub has translated to compress said friction plate means and said friction disc means between said reaction surface and said reaction plate;

a second fluid operated piston axially displaced from the first mentioned piston, slidably disposed in another housing on said one member and being axially aligned with said reaction place;

said reaction plate acting as an apply plate when said second piston is pressurized to enforce translation of said threaded hub toward said first mentioned housing until said apply plate abuts a reaction surface formed on said first mentioned housing.

2. A torque transmitting mechanism comprising:

an input member;

an output member;

a fluid operated piston slidably disposed in a housing on one of said members;

means for pressurizing said piston;

a threaded hub threadably engaging said one member for limited axial translation thereupon;

friction disc means and an apply plate axially slidably and non-rotatably disposed on said one member, and a reaction plate connected for common rotation with said one member;

friction plate means slidably and non-rotatably disposed on another of said input and output members and being alternately spaced with said friction disc means;

a reaction surface on said one member axially aligned with said apply plate to provide a reaction surface for said torque transmitting mechanism when torque is being transmitted in a first rotary direction and said threaded hub has translated to compress said friction plate means and said friction disc means between said reaction surface and said reaction plate;

a second fluid operated piston slidably disposed relative to said one member in co-axi1al relation with said first fluid operated piston;

a second threaded hub threadably engaging said one member for limited axial translation thereupon and disposed in co-axial alignment with said first mentioned threaded hub;

a second friction disc means and a second apply plate axially slidably and non-rotatably disposed on said one member, and a second reaction plate connected for common rotation with said one member;

a second friction plate means slidably and non-rotatably disposed on a second of one of said input and output members and being alternately spaced with said second friction disc means; and a second reaction surface on said one member axially aligned with said second apply plate to provide a reaction surface for said torque transmitting mechanism when torque is being transmitted in a first rotary direction between said one member and said other of said second of said input and output members and said threaded hub has translated to compress said second friction plate means and said second friction disc means between said second reaction surface and said second reaction plate.

3. The torque transmitting mechanism defined in claim 2 further comprising:

said second fluid operated piston being disposed concentric to and radially aligned with said first mentioned fluid operated piston.

4. The torque transmitting mechanism defined in claim 2 further comprising:

said means for pressurizing said piston being operable to pressurize both said pistons independently.

5. A torque transmitting mechanism comprising:

an input member;

an output member;

a fluid operated piston slidably disposed in a housing on one of said members;

means for pressurizing said piston;

a threaded hub threadably engaging said one member for limited axial translation thereupon;

friction disc means and an apply plate axially slidably and non-rotatably disposed on said one member, and a reaction plate connected for common rotation with said one member;

friction plate means slidably and non-rotatably disposed on another of said input and output members and being alternately spaced with said friction disc means;

a reaction surface on said one member axially aligned with said apply plate to provide a reaction surface for said torque transmitting mechanism when torque is being transmitted in a first rotary direction and said threaded hub has translated to compress said friction plate means and said friction disc means between said reaction surface and said reaction plate;

a second fluid operated piston slidably disposed in said housing on said one member;

a second threaded hub threadably engaging said one member for limited axial translation thereupon in radial and axial alignment with said first mentioned threaded hub;

a second friction disc means and a second apply plate axially slidably and non-rotatably disposed on said one member, and a second reaction plate connected for common rotation with said one member;

a second friction plate means slidably and non-rotatably disposed on a second of one of said input and output members and being alternately spaced with said second friction disc means; and a second reaction surface on said one member axially aligned with said second apply plate to provide a reaction surface for said torque transmitting mechanism when torque is being transmitted in a first rotary direction between said one member and said other of said second of said input and output members and said threaded hub has translated to compress said second friction plate means and said second friction disc means between said second reaction surface and said second reaction plate.

6. The torque transmitting mechanism defined in claim 5 further comprising:

said second fluid operated piston being disposed concentric to and radially aligned with said first mentioned fluid operated piston;

said means for pressurizing said piston being operable to pressurize both said pistons independently.

* * * * *